Jan. 20, 1942.  E. H. LAND ET AL  2,270,535
LIGHT POLARIZER AND OPTICAL SYSTEM EMPLOYING THE SAME
Filed June 29, 1938  2 Sheets-Sheet 1

INVENTOR.
Edwin H. Land and
Clinton J. T. Young
BY Brown & Jones
ATTORNEYS.

Jan. 20, 1942. E. H. LAND ET AL 2,270,535
LIGHT POLARIZER AND OPTICAL SYSTEM EMPLOYING THE SAME
Filed June 29, 1938 2 Sheets-Sheet 2

INVENTOR.
Edwin H. Land and
Clinton J. T. Young
BY
Brown & Jones
ATTORNEYS.

Patented Jan. 20, 1942

2,270,535

UNITED STATES PATENT OFFICE 2,270,535

LIGHT POLARIZER AND OPTICAL SYSTEM EMPLOYING THE SAME

Edwin H. Land, Wellesley Farms, and Clinton J. T. Young, Boston, Mass., assignors, by mesne assignments, to Polaroid Corporation, Dover, Del., a corporation of Delaware Application June 29, 1938, Serial No. 216,450

29 Claims. (Cl. 88—65)

This invention relates to new and improved light-polarizers and to optical systems employing the same.

An object of the invention is to provide a light-polarizing sheet adapted to transmit a portion of an incident beam of unpolarized light as a beam of light polarized in a predetermined manner and adapted to transmit the remainder of said incident beam as a beam polarized in a different manner.

Other objects of the invention are to provide a polarizing sheet of the character described comprising a plurality of layers or films of alternately birefringent and isotropic material and to provide such a sheet wherein one of the indices of refraction of the birefringent material is approximately the same as the index of refraction of the isotropic material, and wherein the alternate sheets or films of material are positioned with respect to the direction of propagation of a beam normal to the surface of the polarizing sheet so that a layer of isotropic material and a layer of birefringent material intercept each ray of said beam, and to provide such layers so positioned as to cause total internal reflection from the surfaces between said layers of one component of the incident beam and to provide a sheet of the character described wherein the totally internally reflected component of the incident beam is propagated through the sheet at an angle to the direction of propagation therethrough of the non-reflected component such that the two components are merged for a considerable distance after transmission through the sheet.

Other objects of the invention are to provide a sheet-polarizer of the character described wherein the layers of isotropic and birefringent material comprise cellulosic material, wherein such layers comprise alternate layers of a cellulosic material, such for example as a material comprising a cellulose ester or a cellulose ether, and an adhesive therefor, wherein such layers comprise alternate layers of a cellulosic material and the same material differently plasticized or unplasticized, or wherein such layers comprise Cellophane or Kodapak, or cellulose acetate, or ethyl cellulose, or glass, or quartz, or other transparent material, such for example as transparent plastics, or where such layers comprise one or more birefringent materials, alternate layers having such principal indices of refraction and being arranged with the axes corresponding to their principal indices so disposed that for one component vibration of the incident light there is substantially no difference in index between successive layers, and for the other component there is a difference sufficient to cause total internal reflection when the light is incident at a predetermined angle of incidence upon the boundary between the layers.

A still further object of the invention is to provide, in connection with a light-polarizing sheet of the character described, supplemental means adapted to cause rotation of the plane of polarization or alteration in the characteristics of the polarization of one or both of the transmitted components whereby the two transmitted components are caused to assume the same polarization characteristics or direction of vibration, and more specifically to provide such a supplemental means in sheet-like form and adapted to cause rotation or alteration in the polarization characteristics of the totally internally reflected component of the incident beam.

Other objects of the invention are to provide means for use in connection with the elimination or reduction of automobile headlight glare comprising sheet-like polarizing and polarization-altering means of the character described adapted in conjunction with a suitable light source to project a substantially non-diffused beam of polarized light having uniform polarization properties and comprising substantially more than fifty percent of the incident light, and to provide such a beam where the diversion or difference in direction of propagation of the components thereof is so small that the beam may be adapted for use with an automobile or the like, to illuminate the roadway at a distance in advance of the vehicle.

Other objects of the invention will in part be obvious and will in part appear hereinafter.

The invention accordingly comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description, taken in connection with the accompanying drawings, in which:

Figure 7b is a similar view of a modification of the device shown in Fig. 7a;

Figure 8 is a similar view of a still further modification of the device shown in Fig. 7a;

Various means have been suggested for the elimination or reduction of automobile headlight glare. A preferred method contemplates the use of polarized light. In the issued Patent No. 2,031,045 there is shown a method employing a set suspension of oriented polarizing particles as a means for polarizing the beam emanating from the headlights and as a viewing means for blocking the polarized beam. In the co-pending application Serial No. 96,197, filed August 15, 1936, there is described a system of the same general type employing circularly-polarized light. Each of these systems, while highly satisfactory from the standpoint of glare reduction, possesses the disadvantage that the polarizer employed absorbs a substantial percentage, for example slightly more than fifty percent, of the incident beam, and hence the intensity of the projected headlight beam is substantially reduced. In the co-pending applications Serial Nos. 72,501, filed April 3, 1936, and 83,039, filed June 2, 1936, there is described a light-polarizing body and its use in connection with the elimination of automobile headlight glare comprising a suspension of oriented birefringent particles in a substantially isotropic suspending medium, an index of refraction of the birefringent particles matching substantially the index of refraction of the suspending medium. With such a light-polarizer, the beam projected from the headlight of an automotive vehicle or the like is resolved into two components, one of which is propagated as a substantially non-diffused component and the other as a diffused component and preferably a cylindrically diffused component, each component having a different character of polarization or direction of vibration from that of the other component. With such a device the non-diffused polarized component, which is essentially the glaring component, may be blocked by a suitable polarizing windshield, and glare thus substantially reduced.

It is frequently highly desirable that the beam issuing from the headlight be non-diffused so that transmission through a suitable lens system may make possible complete control of the illumination of the roadway and the sides thereof. The polarizer of the present invention contemplates the provision of means adapted for the transmission of a beam of light comprising two components, each component being undiffused and substantially specular, and the direction of propagation of the two components being closely uniform, i. e., the polarizer of the present invention provides means for the propagation of two specular components and means for controlling the divergence of one component from the other. Such angular divergence may be kept to a low value.

Figure 1:
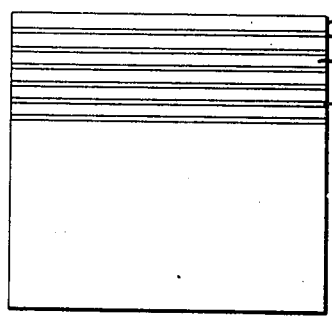
Figure 1 is a diagrammatical representation of an assemblage of sheets from which the polarizer of the present invention is adapted to be formed.
Figure 2:
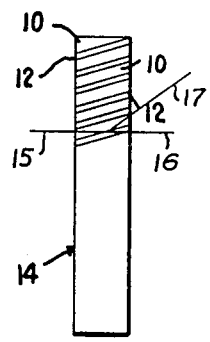
Figure 2 is a plan view of a polarizer of the present invention.

The polarizing body of the present invention may comprise, in a preferred form, a plurality of superimposed thin films or layers of material 10, 12 alternately substantially isotropic and birefringent with an index of refraction of the birefringent layers substantially matching the index of refraction of the isotropic layer for the same vibration, as shown for example in Figs. 1 and 2. The same figures may be deemed representative of a modified form of the invention comprising a plurality of birefringent layers, alternate layers, 10 and 12, having such principal indices of refraction and being so arranged that the axes corresponding to their principal indices are so disposed that for one component vibration of the incident light there is substantially no index difference between successive layers, and for the other component there is an index difference sufficient to cause total internal reflection when the incident light is normal to the surface of the polarizing body. It will be understood that departures from the preferred form of the invention, such for example as devices which function in a slightly less efficient manner than does a preferred embodiment of the invention, are to be considered as falling within the scope of the invention.

A polarizer embodying the invention may be made, for example, by first laminating a plurality of birefringent, sheet-like layers 10 between isotropic sheet-like layers 12, as shown in Fig. 1. After such a lamination has been formed, sheets 14 of the type shown for example in Fig. 2, may be cut or sliced therefrom. In these sheets the surfaces between the birefringent and isotropic layers are preferably at a slight angle to a beam normal to the surface of the cut sheet, the angle being such and the thickness of the sheet being such that substantially all portions of the incident beam normal to the surface thereof impinge once, and once only, within the sheet, from the high-index side upon the boundary between a medium having one index of refraction and a medium having a lower index of refraction, for the component for which the indices are not matched. Thus in Fig. 2, line 15 represents a ray normally incident on the surface of element 14 and which is resolved at the interface between layers 10 and 12 into ray 16 comprising the component for which the indices of refraction of the two layers are substantially equal, and ray 17 comprising the component for which the indices of refraction of the two materials are not matched. The boundary may be distinct or it may be represented by a gradual transition of index. The thickness of the sheet should be kept to a minimum in order to avoid loss of light through absorption, yet it should be thick enough so that the angle made by the boundaries between adjacent isotropic and birefringent media is so slight with respect to a beam normal to the surface of the sheet that the component of the beam reflected from such angular boundaries is diverged but slightly from the component traversing the sheet without reflection. It should be pointed out that the angle formed by the birefringent layers with the surface of the sheet should not be less than the critical angle of incidence for the vibration component for which the indices of the isotropic and birefringent sheets are not matched.

In lieu of isotropic and birefringent sheets, the lamination may comprise solely birefringent sheets, provided they are selected so that alternate sheets have a common index of refraction for the same vibration and have diverse indices of refraction for the other vibration component of the incident beam, and provided that they are assembled in the manner hereinbefore described. If Figs. 1 and 2 be deemed representative of such a structure, then 10 may be understood as representing sheets of a predetermined birefringent material and 12 may be understood as representing sheets of a material having different birefringence, but having, with the sheets 10, a common index of refraction for the same vibration.

In one form, for example, the lamination may comprise successive birefringent layers of the same material, or material having the same optical properties arranged in the manner hereinbefore described. If the material be substantially uniaxial, alternate layers may be arranged with the optic axes thereof extending parallel to the surfaces of said layers and in a direction coinciding with the projection upon the surfaces of said layers of the rays normally incident upon the surface of the polarizer formed from the lamination, and the other layers may comprise the same material, or material having the same optical properties, with the optic axes of said layers extending in a direction substantially parallel to the surface of the said polarizer and preferably parallel with, or perpendicular to, the plane of incidence upon the boundaries between the layers.

Where isotropic and birefringent sheets are employed, if the isotropic layers are thicker than the birefringent layers, the index of refraction of the isotropic layers should preferably match the higher index of the birefringent layers; and if the birefringent layers are thicker than the isotropic layers the index of refraction of the isotropic layers should preferably match the lower index of refraction of the birefringent layers.

In every case a preferred form of the invention is one wherein the birefringent layers, or more accurately the boundaries at which total reflection may take place between adjacent layers of the lamination, give substantially complete coverage for a parallel beam normal to the surface of the sheet. Suitable materials for use in the formation of a lamination of the character described may comprise as the isotropic materials the materials sold as Lucite and Acryloid, glass, vinyl acetate, cellulose acetate propionate, cellulose acetate butyrate, and isotropic cellulose acetate or celuose nitrate. In fact, any isotropic material of suitable transparency and having suitable mechanical properties, such for example as adhesion and thermal stability, may be employed. Plasticizers or other similar materials may, if desired, be combined with some of the isotropic materials employed, or some of the birefringent materials hereafter discussed. Any of these materials should be free from photoelastic strain or accidental birefringence. This may be accomplished by subjecting the films or sheets to a suitable heat treatment, as for example by bringing them to the plastic stage and then permitting them to cool slowly and uniformly and free from tension.

Suitably birefringent material may comprise cellulose, Cellophane, ethyl cellulose, methyl cellulose, benzyl cellulose, and cellulose acetate, such as Kodapak, or Protectoid, or hydroxyl alkyl cellulose films, or Vinylite XYSG. These materials should preferably have been sheeted in such a way as to introduce therein substantially uniform birefringence. Natural crystals such as quartz, sodium nitrate, potassium nitrate, urea, or calcite may be used. The materials mentioned may be bonded or cemented together in such a way that the isotropic layers are thicker than the birefringent layers, in which case the index of refraction of the isotropic layers should match the higher index of the birefringent film, or the materials may be bonded or cemented together in such a way that the birefringent film is thicker than the adjacent isotropic layer, in which case the index of refraction of the isotropic layer should match the lower index of the birefringent film. The indices of refraction of the birefringent materials may be controlled, as for example the indices of refraction of Cellophane may be controlled within predetermined limits by controlling the glycerine or water content thereof. The indices of refraction of the resins or plastics mentioned in the preceding materials may be controlled by adding thereto plasticizers of different index in the manner described more in detail in the said co-pending application Serial No. 83,038.

Suitable bonding materials for use in effecting union between the materials mentioned above, where the materials are not themselves sufficiently adhesive, may comprise various synthetic resins, or other materials such as cellulose nitrate, vinyl acetate, Vinylite XYSG plasticized or unplasticized, gums, such as ester gum, cherry resin and the like. In fact, any of a great number of materials may be employed. If an adhesive is used which does not itself provide a reflecting boundary, it should have an index of refraction preferably so closely approximating that index of the adjacent layers which is the same for one component of the beam that the adhesive does not introduce a boundary or surface which appreciably reflects that component.

Figs. 1 and 2 may also be deemed illustrative of still another form of the invention which may comprise a plurality of layers of optically birefringent material 10 laminated by applying to adjacent faces thereof a small amount of a plasticizer adapted to render isotropic or substantially isotropic at least a thin film 12 between the main bodies of the birefringent sheets. The final lamination may be a substantially unitary structure 14 comprising alternate layers 10 of the plastic with a predetermined plasticizer content and layers 12 of the same plastic with a different predetermined plasticizer content.

A structure for use in the present invention and comprising this type of lamination may comprise layers of cellulose acetate, and more specifically layers of the material sold under the trade name Kodapak, with the contacting surfaces of said layers having added thereto a quantity of plasticizer, and more specifically a mixture of triacetin and dimethyl phthalate in such proportions and in such amount that the plasticized surfaces of contact of the sheets are rendered substantially isotropic and with an index substantially equal to the lower index of the birefringent Kodapak. The Kodapak should be selected to have substantially uniform birefringence and to be free from the mottled appearance in polarized light which characterizes certain grades of the material. Because of the small birefringence of Kodapak, the sheet-like polarizer described above, i. e., formed from slicing the lamination just described, should be so formed that the angles made by the plasticized layers with the surface of the sheet are very nearly 90°, and the sheet may therefore be of greater thickness or the layers of Kodapak employed may be very thin in order to secure complete coverage for a beam normal to the surface of the sheet in the manner previously indicated as preferred. The structure just described, i. e., the sheet-polarizer comprising laminated layers of Kodapak with plasticized films therebetween, is adapted for use where the angular divergence of one component of the incident beam from the the other component is slight.

Other suitable materials for use in the modification of the invention just described may comprise sheets of ethyl cellulose which have been treated to have imparted thereto a predetermined birefringence, by heating, stretching and cooling while under strain, for example, plasticized in layers by the addition thereto of dibutyl phthalate or Santiciser M-17 or sheets of Vinylite XYSG similarly plasticized as with dibutyl phthalate or other suitable plasticizer.

If plastic materials are used so that birefringence of the sheet as a whole results from the orientation of minute elements, one method of obtaining the alternate birefringent and isotropic layers is to destroy the orientation of a thin layer on the surface of a birefringent sheet. Again Figs. 1 and 2 may be deemed illustrative of this modification of the invention. The birefringence of the sheets 10 may be due to the incorporation and orientation therein of minute birefringent elements. The layers 12 may represent surface layers of the sheets 10 wherein the orientation of these minute elements has been destroyed. This may be done by the use of heat, a solvent, a solvent plasticizer, or any other appropriate means. The original sheet may be biaxial and of such a nature after diffusion of solvent or plasticizer is complete that its intermediate principal index will substantially match that of the isotropic layer. The latter, if orientation does not involve a change in volume, will be approximately the arithmetic mean, or more accurately the geometric mean, of the three principal indices of the birefringent sheet. Since the birefringence is not great, this mean index will substantially equal the intermediate principal index if the optic axes make with each other an angle of approximately ninety degrees. Total reflection may then depend upon the difference between either the highest or the lowest index and the intermediate or mean index, the principal axis corresponding to the index which is not used being so disposed as to lie substantially parallel to the surfaces of the component sheet and in a plane perpendicular both to the component sheet and to the surface of the composite sheet.

If the birefringent sheet is uniaxial or if the indices used correspond to the highest and lowest indices of the biaxial sheet, then the index of the disoriented layer may differ from each index of the birefringent sheet. In this case the device may still function almost as previously described because at the large angles of incidence contemplated the component of the light, which is incident from a medium of higher index upon the boundary between this and a medium of lower index may suffer total reflection, even when the difference in indices is not great, whereas the component for which the transition is in the opposite order may undergo only slight reflection for a comparable difference in indices.

Another modification of the invention, which also may be deemed illustrated by Figs. 1 and 2, is one wherein the lamination is formed by employing a plurality of birefringent sheets, of the same or different materials, alternate sheets 10 in the lamination having similar birefringence and adjacent sheets 10, 12 having one common index of refraction for the same vibration and having different indices of refraction for the other vibration component. Suitable materials for use in the construction of such a light-polarizing element may comprise any of the previously mentioned birefringent materials, provided however that if quartz is employed for the reflection of plane-polarized light, any light traversing the quartz should be propagated perpendicular to the optic axis of the quartz.

Figure 5:
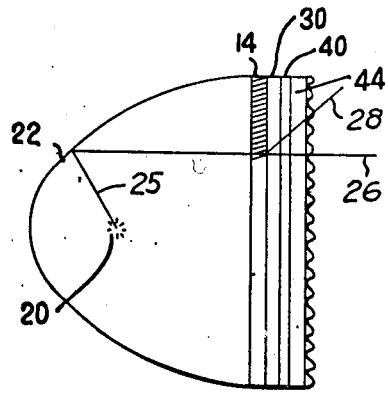
Figure 5 is a diagrammatic view in plan of an automobile headlight equipped with a polarizer of the present invention.

In general, when the two components to be obtained are to be plane-polarized, the operation of the polarizing body of the type herein described is as follows: A beam of unpolarized light normal to the surface of the polarizing sheet 14, as for example a collimated beam comprising rays 25 emanating from a motor vehicle headlight comprising the light source 20 and the reflector 22 or the like, as shown in Fig. 5, is resolved by transmission through the sheet 14 into two components, one component 26 vibrating in the direction for which the indices of refraction of the various materials 10, 12 forming the sheet are substantially the same. This component traverses the sheet as a polarized, non-diffused component having the direction of propagation of the incident beam. This component comprises, in the preferred form of the invention, a portion of each ray of the incident beam. The other component 28 of the incident beam, i. e., the component vibrating at right angles to the non-diverted and first-mentioned component, traverses the sheet vibrating in a direction for which the indices of refraction of the materials forming the sheet differ. The rays forming this component 28 impinge upon the boundaries between adjacent layers in the sheet at angles such that they are totally internally reflected from said surfaces, and these rays leave the sheet as a component diverted in direction from the direction of propagation of the beam incident on the surface of the sheet and polarized at right angles to the direction of polarization of the first-mentioned component 26.

It should be pointed out that in the preferred form of the invention the sheet of polarizing material is so dimensioned that the surfaces between adjacent layers therein are so positioned that this diverted component traverses the sheet preferably with a single reflection from one such boundary for each ray forming a part thereof.

There may be positioned closely adjacent that surface of the light-polarizing element most distant from the light source a wave retardation device 30, for example a quarter-wave retardation device, with its principal axes so positioned with respect to the surfaces between adjacent layers in the sheet that the components emerging from the sheet are in the form of circularly-polarized beams, one component being circularly-polarized in a clockwise direction, the other component being circularly-polarized in a counter-clockwise direction. It will be apparent that the quarter-wave device, which may for example comprise a sheet of Cellophane, or ethyl cellulose, cellulose acetate, or Vinylite XYSG, may be cemented or bonded directly to the emitting surface of the polarizing device so as to give a unitary integral sheet. In lieu of a quarter-wave plate any other fractional wave plate may be employed.

The rays may then traverse a converter 40, of the type hereinafter described, which imparts to the two components the same polarization characteristics, and they may then traverse any desired lens means 44.

Other devices differing somewhat in form and structure from those already described may be employed to separate the incident beam into its two desired components. Certain of these embodiments are shown diagrammatically in Figs. 6 to 9b, inclusive. Many of these forms of the invention are particularly suitable where the beam incident upon the surface of the separating element is not entirely collimated.

Figure 6:
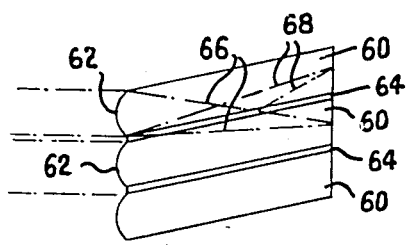
Figure 6 is a diagrammatic view of the modification of the device shown in Fig. 2.

In Fig. 6 there is shown one modification of the invention comprising a structure made up of alternate relatively thick and relatively thin layers. These layers may be made up of any of the materials or combinations of materials already described in connection with Fig. 1. The layers 60 may be taken as corresponding to the layers 10 of Figs. 1 and 2 and the layers 64 as corresponding to the layers 12 of Figs. 1 and 2. In this modification of the invention the relatively thick layers 60 are provided with lenticules 62 on the edges thereof upon which the light is first incident. The relatively thin elements 64 need not be provided with lenticules.

The effect of each lenticule is to compress each component of the beam incident thereon in the manner shown generally as at 66 and 68. It will be apparent that if the device is properly designed it may be useful in connection with light which is imperfectly collimated, as the action of each lenticule will be to cause the transmitted components of light incident thereon to traverse the separator without impinging upon more than one of the thin layers.

Figure 7A:
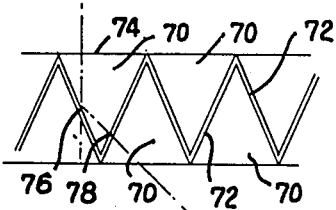
Figure 7a is a similar view of a still further modification of the invention adapted to provide three differently propagated, non-diffused beams, two of which are internally reflected and similarly polarized, and the other of which is non-reflected and differently polarized.
Figure 7B:
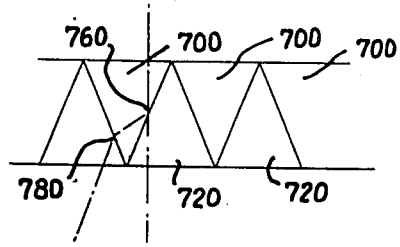

Another form of the invention is shown in Figs. 7a and 7b. In Fig. 7a the material shown as at 70 may be considered as comprising material identical with material forming the relatively thick layers 10 of the devices just described, and the material shown at 72 may be considered as comprising material identical with material forming the thin layers 12 in the devices just mentioned. In this form of the invention, light incident upon the surface 74 is resolved into two components, one of which traverses the separator without reflection from any surface between the material 70 and 72, and the other component is reflected in the manner hereinbefore described, as for example at 76. In this form of the invention the reflected component will impinge upon a second layer of the material 72 as at 78. It will, however, in this instance be incident upon the layer at a smaller angle of incidence, and if this angle is substantially less than the critical angle of incidence, the component will be transmitted by the layer without substantial reflection, in the manner shown diagrammatically in Fig. 7a.

In Fig. 7b a still further modification of the invention is shown. In this form of the invention the material shown as at 700 may be deemed identical with the material shown in Fig. 7a at 70, and the material shown at 720 may be deemed identical with the material shown in Fig. 7a at 72, whereby the surfaces between the material 720 and the material shown at 700 perform substantially the same functions as the first surfaces between the relatively thick and relatively thin layers 10, 12 previously described. In this form of the invention an incident beam will be resolved into two components, one of which will be transmitted by the surface shown as at 760 and the other of which will be reflected therefrom. The reflected component will impinge upon a second surface between the material 700 and the material 720 as at 780, and for the reasons described in connection with Fig. 7a will be transmitted through this boundary or surface. Inasmuch, however, as the indices of refraction of the materials 700 and 720 for this component differ, the direction of propagation of the component will be permanently changed, as shown for example in Fig. 7b.

Figure 8:
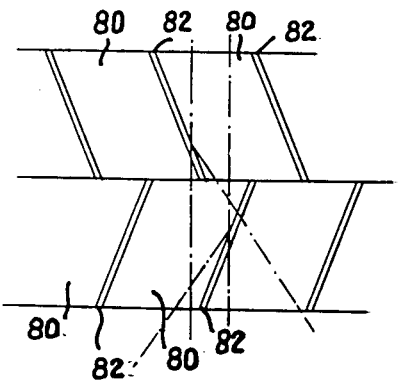

In Fig. 8, there is shown a still further modification of the invention. The form here shown functions in substantially the same manner as does the device shown in Fig. 7a. The thicker layers of material, which may be understood as identical with the material shown at 70 in Fig. 7a, are shown as at 80 and the thinner layers, which may be understood as identical with the material shown at 72 in Fig. 7a, as at 82. The operation of this form of the invention will be understood from the description of the operation of the form of the invention shown in Fig. 7a.

It may be noticed that the devices illustrated in Figs. 7a, 7b and 8 transmit the reflected component as two beams deviated in opposite directions, and the amounts of these deviations may be equal.

This invention contemplates, in addition to the provision of improved means for separating a beam of light into its two components, means for causing the two components while merged to acquire the same polarization characteristics. These means will be described hereinafter. It is to be understood that these latter means, which may be termed converters, are useful in connection with means other than those heretofore described, i. e., the means for separating a beam of light into its two components and imparting to those components differences in direction of propagation. For example, the converters hereinafter described may be employed in connection with such devices as double image prisms. Certain of these devices are shown diagrammatically in Figs. 9a and 9b.

Figure 9A:
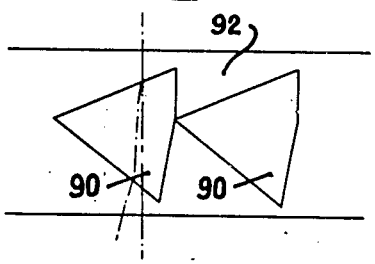
Figure 9a is a diagrammatic view of a still further modification of the invention wherein prisms of a birefringent crystal are positioned within a surrounding medium having an index of refraction matching one of the reflected indices of the prisms.

In Fig. 9a there is shown a device comprising prisms of a crystal, such for example as sodium nitrate 90, positioned within a surrounding medium 92 having an index of refraction in the instance shown coinciding substantially with the upper index of refraction of sodium nitrate. In the form shown in Fig. 9a, the structure is designed to provide a minimum of incidence of the deflected component of the transmitted beam upon the surfaces of the prisms intended to be ineffective. To this end the prisms are shaped as shown in Fig. 9a. That edge of one prism which is adjacent an apex of another prism is so shaped that light traversing the second prism and comprising the deflected component will preferably not impinge upon the said face of the first prism. The face is hence cut away, as shown in Fig. 9a, at approximately the angle of deflection of the deflected component.

Figure 9B:
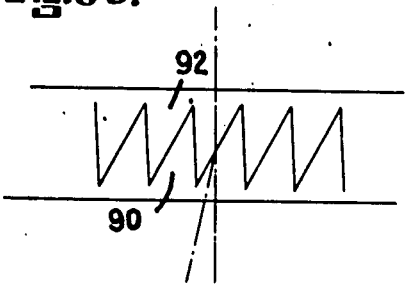
Figure 9b is a similar view of a modification of the invention shown in Fig. 9a involving a simpler form of double-image prism construction.

Another and somewhat simpler form of double image prism construction is shown in Fig. 9b, where the materials 92 and 90 represent for example, a set of Rochon or Wollaston prisms mounted side by side.

Many modifications of double image prism combinations will be useful in the present invention. Their operation will be immediately understood by those skilled in the art. All such modifications are deemed to fall within the scope of this application.

Figures 3A, 3B:
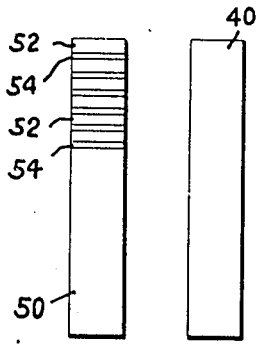
Figures 3a and 3b are plan views of two forms of the supplementary means intended for use in a polarizer of the present invention.
Figure 4:
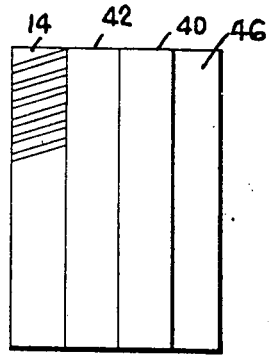
Figure 4 is a diagrammatic plan view of a polarizer of the present invention assembled with one form of the said supplemental means.

In Figs. 3a and 3b there is shown apparatus for effecting rotation or alteration in the characteristics of the plane of polarization of one or both of the components of the transmitted beam, whereby those components are caused to assume the same characteristics of polarization or direction of vibration.

This means may take one of many forms. It may be, for example, a uniaxial, birefringent sheet 40, as shown in Fig. 3b with its principal optical axis normal to the surface thereof and of such a birefringence and thickness that it functions as a half-wave retardation plate for polarized light incident thereon at the angle of the totally internally reflected component of the beam transmitted by the polarizer when the uniaxial sheet is positioned with its surface parallel to the surface of the polarizing sheet. A suitable material for use in this form of the device may comprise a sheet of ethyl cellulose, which is made by casting to give it the desired optical properties.

If this form of rotating or polarization-altering device is employed in connection with two plane-polarized components, means 42 should preferably be provided, positioned for example between the polarizing sheet and the rotating sheet, to cause the vibrations of the deflected beam to make angles of substantially 45° with the azimuths of resolution within the rotating sheet for light propagated in this direction.

If desired, further means 46 may be added to give to both beams emerging from the rotating sheet any desired vibration azimuth or state of polarization.

If a uniaxial sheet of the type described is used in connection with circularly-polarized light, and used as hereinbefore described, no account of azimuths of resolution need be taken.

The principle described can be applied to the use of biaxial materials. In this case the sheet may be formed, as by stacking and slicing birefringent sheets, and mounted in such a way that one optic axis coincides substantially with the direction of propagation of the beam which is not to be altered and the other optic axis does not coincide with the direction of propagation of the beam which is to be altered. The orientation of the sheet about the first-mentioned axis may be so chosen as to provide, if desired, without additional means, the desired azimuths of resolution for the beam whose polarization characteristics are to be altered.

The means to effect desired alteration in the polarization characteristics of one or both of the components of the beam traversing the polarizing sheet may comprise, as shown in Fig. 3a, a lamination 50 of optically isotropic material 52, alternating with films or sheets of material 54 which is substantially a half-wave retardation material for one of the components at the angle at which that component traverses the film or sheet. A preferred form of this type of structure is that shown in Fig. 3a, wherein the lamination of half-wave material 54 with the optically isotropic material 52 is accomplished in such a manner that the layers of half-wave material lie in planes substantially parallel to the direction of propagation of the component of the transmitted beam upon which they are not intended to act. In this position the half-wave layers will intercept the other component of the transmitted beam, and they should preferably be so arranged in the lamination of which they are a part that substantially all portions of such component traverse one and only one of the half-wave sheets. It will be understood that the structure may be such that a plurality of fractional wave plates intercept the component to be acted upon and have the total effect of a half-wave plate. Such a lamination might comprise any of the previously mentioned optically isotropic materials cemented or bonded to any of the previously mentioned birefringent materials.

In order to accomplish rotation of the vibration direction of the beam which traverses the birefringent sheet, the azimuths of resolution within the latter for the direction of propagation of the light to be acted upon should make angles of substantially 45° with the vibrations of the incident light if this is plane-polarized. This may be accomplished by sectioning and positioning the converting structure in such a way that the principal axes of the birefringent sheets are so oriented within it as to provide the required dispositions of the azimuths of resolution. This may also be accomplished by suitable orientation of the converting structure about the axis of the beam which is not to be acted upon. Alternatively, the condition may be met by preparing the light emerging from the original polarizer by changing its vibration directions or states of polarization as was described in connection with the use of a uniaxial sheet with its axis normal to the surface.

The materials of such a structure should be chosen to be of such refractive indices that when the beam being acted upon strikes the boundary between two media it will not be strongly reflected.

A still further modification of the element adapted to alter the polarization properties of either or both of the transmitted components is one wherein a substantially unitary mass of birefringent material is formed, as for example from sheets of Cellophane cemented together, with a minimum of cement, or the mass may be formed from any birefringent material not optically rotatory. From this mass sections may be cut in the following manner: If the original sheets are uniaxial, their axes should lie in a plane substantially perpendicular to the surfaces of the section, and if they are biaxial, the axes corresponding to their intermediate principal indices should be substantially parallel to the surfaces of the section. For light incident normally upon the section, directions respectively parallel and perpendicular to the intersections of the component sheets with the surfaces of the sections will be azimuths of resolution; and vibrations occurring in these directions will be transmitted unaltered. By suitably choosing the orientation of the surfaces of the section with respect to the principal axes of the material, the azimuths of resolution within the latter for light propagated in the predetermined direction of the deflected beam can be disposed at 45° to the direction of vibration which exists in the deflected beam when the vibration direction of the undeflected beam coincides with an azimuth of resolution for light propagated normally to the surface of the section. The intersections of the surfaces of the component sheets with those of the section should preferably be parallel to the plane defined by the directions of propagation of the two component beams. By suitable choice of the thickness of the section in relation to its birefringence for light propagated in the direction of the deflected beam, any desired relative retardation can be introduced between the components of the latter. For instance, if this relative retardation is half a wavelength, the vibrations of the deflected beam will be rotated through 90° and emerge oriented at the same angle as those of the undeflected beam to the plane defined by the directions of propagation of the two beams.

It is to be noted that this device functions by virtue of the manner in which light is transmitted through the birefringent materials. Therefore, the use of component sheets is of importance only as a means of handling the materials. The sections may be cut from any mass having the required optical properties. The axis of a uniaxial material should be in a plane perpendicular to the surfaces of the section and to the plane defined by the directions of propagation of the two diverging beams. If the material is biaxial, its intermediate axis should be parallel to the latter plane and to the surfaces of the section.

Figure 10:
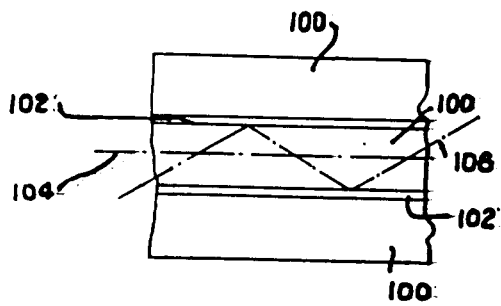
Figure 10 is a similar view of a further modification of the devices shown in Figs. 3a and 3b.

Other forms of converters or devices adapted to alter the polarization properties of either or both of the transmitted components are illustrated diagrammatically in Fig. 10. In these forms, alteration of the polarization characteristics is accomplished by causing a relative phase shift between the components parallel to and perpendicular to the plane of incidence of the light upon a reflecting surface. The device may comprise transparent slabs of material 100 separated by other relatively thin layers of another material 102. The layers 102 should be substantially parallel to the direction of propagation of the beam 104 which it is not desired to alter. The material 102 may be a metal or a dielectric material of refractive index sufficiently below that of the material 100 so that light incident upon it in the direction of the deviated beam or beams will be totally reflected. In either case a difference in phase will be introduced between components of the reflected light 106 perpendicular to and parallel to the plane of incidence upon the reflecting surface. The proportions of the device may be so chosen that a deviated beam will undergo a sufficient, and preferably only a sufficient, number of reflections to accomplish the desired total difference in phase between its components. If a metal is used as the reflecting medium it should be one in which the angle of incidence used has substantially equal reflectivity for the two components. The device may be so positioned that the incident vibrations of the light coming directly from the structure into which it has been divided into two beams will make an angle of 45° with its plane of incidence upon the reflecting surfaces, or the light may be prepared by having its vibrations rotated to the proper azimuth or rendered circular.

The converters hereinbefore described have been discussed chiefly in terms of their use with two divergent and oppositely polarized beams, but those skilled in the art will have no difficulty in appreciating the applicability of certain forms to use with a greater number of beams.

The operation of the entire device will be apparent. An incident parallel beam of light impinging upon the polarizing sheet is resolved in the manner heretofore described into two differently polarized components, which may be either circularly-polarized or elliptically-polarized. These components then traverse an element comprising means of the character hereinbefore described to effect relative alteration in the polarization properties of one of the components with respect to the other or alteration in the polarization properties of both. As the components traverse this element their polarization characteristics are altered so that upon emergence from the element each component possesses the same polarization characteristics.

The entire device may be formed, if desired, as a unitary structure. The polarizing sheet, the sheet adapted to alter the polarization of one or both of the components and any auxiliary wave retardation devices may all be cemented or bonded together.

While the combination has heretofore been described primarily in connection with an assemblage wherein the undeviated component of the incident beam may traverse all the elements of the combination without alteration in its polarization characteristics, it is to be understood that this component may, if desired, be acted upon as well as the deviated component.

It is to be observed that the devices disclosed for bringing both beams to a like state of polarization may be designed to function by acting upon both beams and introducing between their respective components relative retardations whose algebraic sum is substantially equal to one-half wavelength. This may be done by causing one beam to undergo an absolute relative retardation substantially one-half wavelength greater than that undergone by the other or by choosing the directions of propagation in such a way that the azimuths of resolution for the two beams are interchanged in respect to index, i. e., so that whereas one component of one beam is retarded with respect to the other component, the corresponding component of the other beam is the one which is less retarded. The latter method may be applied to those above-described forms of the device which operate by taking advantage of the change of azimuths of resolution with direction of propagation. For instance, in the form in which azimuths of resolution for a beam propagated in one direction are respectively horizontal and vertical and in which one component of linearly-polarized light so oriented is propagated in this direction, modification may be made such that the two beams are propagated at substantially equal and opposite angles to this direction. If the vibrations of the two beams both make angles of substantially 45° with their respective azimuths of resolution, the latter will be interchanged or made inversely corresponding. This particular arrangement is especially suitable to the introduction of a quarter-wave relative retardation between the component vibrations of each beam, by which means the two oppositely linearly-polarized beams may be caused to assume a substantially uniform state of circular polarization. Other modifications of the principle may be employed, for instance, the sheet may be so formed and positioned that one of the azimuths of resolution for one beam makes an angle of 22½° with the plane defined by the directions of propagation of the two beams. For the other beam, the corresponding azimuth of resolution may then make with this plane an angle of 22½° in the opposite sense. If the vibrations of the beams are linear and respectively parallel and perpendicular to the plane defined by the beams and if the relative retardation introduced between the components of each is one-half wavelength, both of the vibrations will emerge from the sheet so oriented as to make the same angle with the plane defined by the beams.

Furthermore, it is to be understood that the element adapted for alteration in the polarization characteristics of either or both of the transmitted components may be positioned at an angle to the polarizing element and/or to the direction of propagation of either of the components.

In the foregoing specification, the references to "sliced sheets" and to "slicing" are to be understood as including sheets, slabs and the like formed by sawing or otherwise severing the sheets or slabs from the main mass or body. Where the separation is formed by means of a knife blade, altered birefringence may be imparted to the severed sheet. No account has been taken, in the foregoing specification, of this phenomenon. It should be taken into consideration if the severed sheets are formed in a manner adapted to alter their birefringence.

Sheets of plastic material may be brought to a state of orientation by the operation of slicing alone. The orientation of birefringent elements is usually such as to make the material birefringent with one optic axis nearly perpendicular to the surface. Its exact position can be somewhat controlled by varying the thickness of the slice, the angle of the knife, and other slicing conditions and consistency of the material. The other axis is nearly parallel to the surface. The micelles tend to align themselves in a direction inclined to the surface and emerging in the direction in which the knife travels on the side of the sheet next to the knife. In the work that has been done, this inclination is about 45° to the surface of the sheet and in a plane perpendicular to the surface of the sheet and parallel to the direction of knife travel (perpendicular to the edge of the knife).

If the original material initially is very well oriented, the material can remain uniaxial. The effect of slicing is then to tilt the axis. Very well oriented sections can be obtained when the block is so mounted that its axis and the line of the new orientation coincide. Slices with the original axis parallel to the surface are apparently unchanged.

In general, uniaxial sections do not result when slices are cut from imperfectly oriented material. Whenever the slices are taken in such a way that the new effect can cooperate with orientation already present, homogeneity is markedly improved; and birefringence is higher than would have been the case if the material had been without any previous orientation. Orientation is higher on the side next to the knife.

This technique can be used, for instance, in preparing sheet converters for headlight polarizers. With one optic axis nearly normal to the surface, positions in the lateral dimension (perpendicular to the plane of the optic axes) will have azimuths of resolution inclined at 45° to this dimension. Sheets of this type can be used for other modifications of the converter.

It is to be understood that while the invention has been described in connection with its use on automobile headlights and the like for the elimination or reduction of headlight glare in cooperation for example with suitable viewing means, such for example as visors of the material sold under the trade name "Polaroid," the structure of the invention is adapted for a wide variety of other uses. It may, for example, be employed in connection with reading lamps, or in many other applications where a polarized beam is desired.

It is to be observed that the devices herein disclosed may function satisfactorily even if the transition between optical properties from one stratum to the next takes place somewhat gradually. This is important, for instance, in connection with the first-disclosed structure, that provided for the separation of a beam into two divergent beams differently polarized. This device makes use of total reflection. If, instead of a sharp boundary adapted to cause total reflection, for example between the layers 10 and 12 in Figs. 1 and 2 there is a gradual transition, like optical properties occurring in parallel planes, a ray of light entering the transitional layer will be progressively refracted so as to leave the transitional layer in the same direction as if it had been reflected from a sharp boundary. The presence of such transitional layers may be useful in reducing the likelihood of reflection of part of the light which it is desired not to reflect, but they should preferably be so thin that their edges do not intercept a substantial part of the incident or emerging light.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described our invention, what we claim as new and desire to secure by Letters Patent is:

1. In combination, means providing a substantially collimated beam of light, a light-polarizing device in sheet-like form adapted to resolve light incident thereon into a plurality of differently polarized, partially merged light beams having relatively slightly differing directions of propagation and both of which component beams traverse said device, said device comprising a multiplicity of birefringent elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, said birefringent elements each having plane surfaces forming at least one interface with said light-transmitting material, said birefringent elements being so positioned that corresponding ones of said interfaces make equal angles with a normal to said sheet, and means for so positioning said device in the path of said light beam that said beam is incident upon said interfaces at a predetermined angle, said angle being at least equal to the critical angle of incidence for light vibrating in the direction for which the indices of refraction of said light-transmitting material and said birefringent elements are not matched.

2. In combination, means providing a substantially collimated beam of light, a light-polarizing device in sheet-like form adapted to resolve light incident thereon into a plurality of differently polarized, partially merged light beams having relatively slightly differing directions of propagation and both of which component beams traverse said device, said device comprising a multiplicity of birefringement elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, each of said birefringent elements having plane surfaces forming at least one interface with said light-transmitting material, said birefringent elements being so positioned that corresponding ones of said interfaces make equal angles with a normal to said sheet, means for so positioning said device in the path of said collimated beam that said beam is incident upon said interfaces at a predetermined angle, said angle being at least equal to the critical angle of incidence for light vibrating in the direction for which the indices of refraction of said light-transmitting material and said birefringent elements are not matched, a second light-transmitting sheet comprising means for causing the component beams transmitted by said polarizing device to assume the same polarization characteristics, and means for positioning said last named device in the path of the merged portions of said component beams.

3. In combination, means providing a substantially collimated beam of light, a light-polarizing device in sheet-like form adapted to resolve light incident thereon into a plurality of differently polarized, partially merged light beams having relatively slightly differing directions of propagation and both of which component beams traverse said device, said device comprising a multiplicity of birefringent elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, each of said birefringent elements having plane surfaces forming at least one interface with said light-transmitting material, said birefringent elements being so positioned that corresponding ones of said interfaces make equal angles with a normal to said sheet, means for so positioning said device in the path of said collimated beam that said beam is incident upon said interfaces at a predetermined angle, said angle being at least equal to the critical angle of incidence for light vibrating in the direction for which the indices of refraction of said light-transmitting material and said birefringent elements are not matched, a second light-transmitting sheet comprising birefringent material for causing the component beams transmitted by said polarizing device to assume the same polarization characteristics, and means for positioning said last named device in the path of the merged portions of said component beams.

4. In combination, means providing a substantially collimated beam of light, a light-polarizing device in sheet-like form adapted to resolve light incident thereon into a plurality of differently polarized, partially merged light beams having relatively slightly differing directions of propagation and both of which component beams traverse said device, said device comprising a multiplicity of birefringent elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, each of said birefringent elements having plane surfaces forming at least one interface with said light-transmitting material, said birefringent elements being so positioned that corresponding ones of said interfaces make equal angles with a normal to said sheet, means for so positioning said device in the path of said collimated beam that said beam is incident upon said interfaces at a predetermined angle, said angle being at least equal to the critical angle of incidence for light vibrating in the direction for which the indices of refraction of said light-transmitting material and said birefringent elements are not matched, a second light-transmitting sheet comprising birefringent material for causing the component beams transmitted by said polarizing device to assume the same polarization characteristics, and means for positioning said last-named device in the path of the merged portions of said component beams, said sheet being positioned with one of its optical axes coinciding with the direction of propagation of one of said beams and being of such birefringence that it functions as a half-wave retardation plate for the other of said beams.

5. In combination, means providing a substantially collimated beam of light, a light-polarizing device in sheet-like form adapted to resolve light incident thereon into a plurality of differently polarized, partially merged light beams having relatively slightly differing directions of propagation and both of which component beams traverse said device, said device comprising a multiplicity of birefringent elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, each of said birefringent elements having plane surfaces forming at least one interface with said light-transmitting material, said birefringent elements being so positioned that corresponding ones of said interfaces make equal angles with a normal to said sheet, means for so positioning said device in the path of said collimated beam that said beam is incident upon said interfaces at a predetermined angle, said angle being at least equal to the critical angle of incidence for light vibrating in the direction for which the indices of refraction of said light-transmitting material and said birefringent elements are not matched, a second light-transmitting sheet comprising means for causing the component beams transmitted by said polarizing device to assume the same polarization characteristics, said sheet comprising alternate, transverse layers of optically isotropic and birefringent material, and means for positioning said second sheet in the path of the merged portions of said component beams, said sheet being positioned with the planes of said layers substantially parallel with the direction of one of said beams and said birefringent layers being of such thickness and width that the other of said beams traverses so many thereof that its polarization charactertics are altered to conform to those of the first said beam.

6. In combination, means providing a substantially collimated beam of light, a light-polarizing device in sheet-like form adapted to resolve light incident thereon into a plurality of differently polarized, partially merged light beams having relatively slightly differing directions of propagation and both of which component beams traverse said device, said device comprising a multiplicity of birefringent elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, each of said birefringent elements having plane surfaces forming at least one interface with said light-transmitting material, said birefringent elements being so positioned that corresponding ones of said interfaces make equal angles with a normal to said sheet, means for so positioning said device in the path of said collimated beam that said beam is incident upon said interfaces at a predetermined angle, said angle being at least equal to the critical angle of incidence for light vibrating in the direction for which the indices of refraction of said light-transmitting material and said birefringent elements are not matched, a second light-transmitting sheet comprising means for causing the component beams transmitted by said polarizing device to assume the same polarization characteristics, said sheet comprising alternate, transverse layers of optically isotropic and birefringent material, and means for positioning said sheet in the path of the merged portions of said component beams, said sheet being positioned with the planes of said layers substantially parallel with the direction of propagation of one of said beams, each of said birefringent layers being of such birefringence that it functions as a half-wave retardation device for the other of said beams at the angle at which it traverses said sheet, said sheet being of such thickness that said beam traverses only one of said birefringent layers in passing through said sheet.

7. In combination, means providing a substantially collimated beam of light, a light-polarizing device in sheet-like form adapted to resolve light incident thereon into a plurality of differently polarized, partially merged light beams having relatively slightly differing directions of propagation and both of which component beams traverse said device, said device comprising a multiplicity of birefringent elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, each of said birefringent elements having plane surfaces forming at least one interface with said light-transmitting material, said birefringent elements being so positioned that corresponding ones of said interfaces make equal angles with a normal to said sheet, means for so positioning said device in the path of said collimated beam that said beam is incident upon said interfaces at a predetermined angle, said angle being at least equal to the critical angle of incidence for light vibrating in the direction for which the indices of refraction of said light-transmitting material and said birefringent elements are not matched, a second light-transmitting sheet comprising means for causing the component beams transmitted by said polarizing device to assume the same polarization characteristics, said sheet comprising a straticulate structure of transparent strata separated by reflecting surfaces, and means for positioning said sheet in the path of the merged portions of aid component beams, said sheet being positioned with the planes of said transparent strata substantially parallel with the direction of propagation of one of said beams, said sheet being of such thickness that the other of said beams is reflected within said sheet a sufficient number of times to cause its polarization characteristics to conform to those of the other said beam, both of said beams traversing said sheet.

8. In combination, means providing a substantially collimated beam of light, a light-polarizing device in sheet-like form adapted to resolve light incident thereon into a plurality of differently polarized, partially merged light beams having relatively slightly differing directions of propagation and both of which component beams traverse said device, said device comprising a multiplicity of birefringent elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, each of said birefringent elements having plane surfaces forming at least one interface with said light-transmitting material, said birefringent elements being so positioned that corresponding ones of said interfaces make equal angles with a normal to said sheet, means for so positioning said device in the path of said collimated beam that said beam is incident upon said interfaces at a predetermined angle, said angle being at least equal to the critical angle of incidence for light vibrating in the direction for which the indices of refraction of said light-transmitting material and said birefringent elements are not matched, a second light-transmitting sheet comprising birefringent material for causing the component beams transmitted by said polarizing device to assume the same polarization characteristics, means for positioning said sheet in the path of the merged portions of said component beams, a third sheet comprising birefringent material, and means for positioning said sheet between said first named sheets, said third sheet being of such birefringence and being so positioned relatively to the other said sheets with respect to its optical axes that it causes the vibration direction of at least one of said beams to make predetermined angles with the azimuths of resolution within said second named sheet.

9. In combination, means providing a plurality of substantially collimated, partially merged beams of light having slightly differing directions of propagation and being polarized to vibrate substantially at right angles to each other, and means for causing said beams to assume substantially the same polarization characteristics, said means comprising a sheet of birefringent material, and means for positioning said sheet in the path of the merged portions of said beams, both of said beams traversing said birefringent sheet, said sheet being positioned with one of its optical axes coinciding with the direction of propagation of one of said beams and being of such birefringence that it functions as a half-wave retardation plate for the other of said beams.

10. In combination, means providing a plurality of substantially collimated, partially merged beams of light having slightly differing directions of propagation and different polarization characteristics, means for causing said beams to assume substantially the same polarization characteristics, said last mentioned means comprising a sheet-like element comprising alternate, transverse layers of optically isotropic and birefringent material, and means for positioning said sheet in the path of the merged portions of said beams, said sheet being positioned with the planes of said layers substantially parallel with the direction of propagation of one of said beams and said birefringent layers being of such thickness and width that the other of said beams traverses so many thereof that its polarization characteristics are altered to conform to those of the first said beam.

11. In combination, means providing a plurality of substantially collimated, partially merged beams of light having slightly differing directions of propagation and different polarization characteristics, means comprising a sheet-like element comprising a straticulate structure of transparent strata separated by reflecting surfaces, and means for positioning said sheet-like element in the path of the merged portions of said beams, said sheet-like element being positioned with the planes of said transparent strata substantially parallel with the direction of propagation of one of said beams, said sheet-like element being of such thickness that the other of said beams impinges upon said reflecting surfaces a sufficient number of times to cause its polarization characteristics to conform to those of the first mentioned beam, both of said beams traversing said sheet-like element.

12. A light-polarizing device in sheet-like form comprising, in combination, a multiplicity of birefringent elements having plane surface portions and means comprising light-transmitting material for assembling said elements in spaced relation in said device, the index of refraction of said light-transmitting material matching the index of refraction of said birefringent elements for light vibrating in a predetermined direction and differing therefrom for light vibrating at right angles to said direction, a plane surface of each of said birefringent elements forming an interface with said light-transmitting material, said birefringent elements being so positioned that said interfaces are inclined at a common angle to the plane of said sheet, said angle being at least equal to the critical angle of incidence on said interfaces for light vibrating in the direction for which the indices of refraction of said light-transmitting material and said birefringent elements are not matched.

13. A light-polarizing device in sheet-like form comprising, in combination, a multiplicity of birefringent elements and a multiplicity of optically isotropic elements intercalated with said birefringent elements, the index of refraction of said isotropic elements matching the index of refraction of said birefringent elements for light vibrating in a predetermined direction and differing therefrom for light vibrating at right angles to said direction, said birefringent elements having each plane surface portions forming an interface with a complementary surface portion of an isotropic element, said interfaces being inclined at a common angle to a surface of said device, said angle being at least equal to the critical angle of incidence on said interfaces for light vibrating in the direction for which the indices of refraction of said isotropic elements and said birefringent elements are not matched.

14. A light-polarizing device in sheet-like form comprising, in combination, a multiplicity of transverse, birefringent elements, the index of refraction of each of said elements matching the index of refraction of adjacent elements for light vibrating in a predetermined direction and differing therefrom for light vibrating at right angles to said direction, said elements having each plane surface portions forming an interface with a complementary surface portion of an adjacent element, said interfaces being inclined at a common angle to a surface of said device, said angle being at least equal to the critical angle of incidence of said interfaces for light vibrating in the direction for which the indices of refraction of adjacent elements are not matched.

15. A light-polarizing device in sheet-like form comprising, in combination, a multiplicity of transverse birefringent elements and a multiplicity of light-transmitting elements intercalated with said birefringent elements, the index of refraction of said light-transmitting elements matching the index of refraction of said birefringent elements for light vibrating in a predetermined direction and differing therefrom for light vibrating at right angles to said direction, said birefringent elements having each plane surface portions forming an interface with a complementary surface portion of a light-transmitting element, said interfaces being inclined at a common angle to a surface of said device, said angle being such that light normally incident on the surface of said sheet and traversing said sheet and vibrating in the direction for which the indices of refraction of said light-transmitting elements and said birefringent elements are not matched is substantially completely internally reflected from said interfaces.

16. A light-polarizing device in sheet-like form comprising, in combination, a multiplicity of transverse birefringent elements and a multiplicity of light-transmitting elements intercalated with said birefringent elements, the index of refraction of said light-transmitting elements matching the index of refraction of said birefringent elements for light vibrating in a predetermined direction and differing therefrom for light vibrating at right angles to said direction, said birefringent elements having each plane surface portions forming an interface with a complementary surface portion of a light-transmitting element, said interfaces being inclined at a common angle to a surface of said device, said angle being such that light normally incident on the surface of said sheet and traversing said sheet and vibrating in the direction for which the indices of refraction of said light-transmitting elements and said birefringent elements are not matched is substantially completely internally reflected from said interfaces, said sheet being of such thickness that light so internally reflected leaves said device before impinging upon a further said interface.

17. In combination, means providing a substantially collimated beam of light, a light-polarizing device in sheet-like form adapted to resolve light incident thereon into a plurality of differently polarized, partially merged light beams having relatively slightly differing directions of propagation, said device comprising a multiplicity of birefringent elements and a multiplicity of light-transmitting elements, said light-transmitting elements and birefrigent elements having a substantially common index of refraction for light vibrating in a predetermined direction and having different indices of refraction for light vibrating at right angles to said direction, said birefringent elements each having plane surface portions forming an interface with a complementary surface portion of a light-transmitting element, said interfaces being substantially parallel, means for positioning said device adjacent the first-mentioned means, the said interfaces being held in an inclined position with respect to said collimated beam so that said beam is incident upon said interfaces at a predetermined angle, said angle being at least equal to the critical angle of incidence for light vibrating in the direction for which the indices of refraction of said light-transmitting elements and said birefringent elements are not matched, a second light-transmitting sheet comprising birefringent material for causing the component beams transmitted by said polarizing device to assume the same polarization characteristics, and means for positioning said last named sheet adjacent to, in parallelism with, and overlying said polarizing device so as to be in the path of the merged portions of said component beams, said second sheet being positioned with one of its optical axes coinciding with the direction of propagation of one of said beams and being of such birefringence that it functions as a half-wave retardation plate for the other of said beams.

18. In combination, means providing a substantially collimated beam of light, a light-polarizing device in sheet-like form adapted to resolve light incident thereon into a plurality of differently polarized, partially merged light beams having relatively slightly differing directions of propagation, said device comprising a multiplicity of birefringent elements and a multiplicity of light-transmitting elements, said light-transmitting elements and birefringent elements having a substantially common index of refraction for light vibrating in a predetermined direction and having different indices of refraction for light vibrating at right angles to said direction, said birefringent elements each having plane surface portions forming an interface with a complementary surface portion of a light-transmitting element, said interfaces being substantially parallel, means for positioning said device adjacent the first-mentioned means, the said interfaces being held in an inclined position with respect to said collimated beam so that said beam is incident upon said interfaces at a predetermined angle, said angle being at least equal to the critical angle of incidence for light vibrating in the direction for which the indices of refraction of said light-transmitting elements and said birefringent elements are not matched, a second light-transmitting sheet comprising means for causing the component beams transmitted by said polarizing device to assume the same polarization characteristics, said sheet comprising alternate, transverse layers of optically isotropic and birefringent material, and means for positioning said last named sheet adjacent to, in parallelism with, and overlying said polarizing device so as to be in the path of the merged portions of said component beams, said second sheet being positioned with the planes of said layers substantially parallel with the direction of propagation of one of said beams and said birefringent layers being of such thickness and width that the other of said beams traverses so many thereof that its polarization characteristics are altered to conform to those of the first said beam.

19. In combination, means providing a substantially collimated beam of light, a light-polarizing device in sheet-like form adapted to resolve light incident thereon into a plurality of differently polarized, partially merged light beams having relatively slightly differing directions of propagation, said device comprising a multiplicity of birefringent elements and a multiplicity of light-transmitting elements, said light-transmitting elements and birefringent elements having a substantially common index of refraction for light vibrating in a predetermined direction and having different indices of refraction for light vibrating at right angles to said direction, said birefringent elements each having plane surface portions forming an interface with a complementary surface portion of a light-transmitting element, said interfaces being substantially parallel, means for positioning said device adjacent the first-mentioned means, the said interfaces being held in an inclined position with respect to said collimated beam so that said beam is incident upon said interfaces at a predetermined angle, said angle being at least equal to the critical angle of incidence for light vibrating in the direction for which the indices of refraction of said light-transmitting elements and said birefringent elements are not matched, a second light-transmitting sheet comprising means for causing the component beams transmitted by said polarizing device to assume the same polarization characteristics, said sheet comprising alternate, transverse layers of optically isotropic and birefringent material, and means for positioning said last named sheet adjacent to, in parallelism with, and overlying said polarizing device so as to be in the path of the merged portions of said component beams, said sheet being positioned with the planes of said layers substantially parallel with the direction of propagation of one of said beams, each of said birefringent layers being of such birefringence that it functions as a half-wave retardation device for the other of said beams at the angle at which it traverses said sheet, said second sheet being of such thickness that said beam traverses only one of said birefringent layers in passing through said sheet.

20. In combination, means providing a substantially collimated beam of light, a light-polarizing device in sheet-like form adapted to resolve light incident thereon into a plurality of differently polarized, partially merged light beams having relatively slightly differing directions of propagation, said device comprising a multiplicity of birefringent elements and a multiplicity of light-transmitting elements, said light-transmitting elements and birefringent elements having a substantially common index of refraction for light vibrating in a predetermined direction and having different indices of refraction for light vibrating at right angles to said direction, said birefringent elements each having plane surface portions forming an interface with a complementary surface portion of a light-transmitting element, said interfaces being substantially parallel, means for positioning said device adjacent the first-mentioned means, the said interfaces being held in an inclined position with respect to said collimated beam so that said beam is incident upon said interfaces at a predetermined angle, said angle being at least equal to the critical angle of incidence for light vibrating in the direction for which the indices of refraction of said light-transmitting elements and said birefringent elements are not matched, a second light-transmitting sheet comprising means for causing the component beams transmitted by said polarizing device to assume the same polarization characteristics, said sheet comprising a straticulate structure of transparent strata separated by reflecting surfaces, and means for positioning said last named sheet adjacent to, in parallelism with, and overlying said polarizing device so as to be in the path of the merged portions of said component beams, said second sheet being positioned with the planes of said transparent strata substantially parallel with the direction of propagation of one of said beams, said second sheet being of such thickness that the other of said beams is reflected within said sheet a sufficient number of times to cause its polarization characteristics to conform with those of the other said beam, both of said beams traversing said sheet.

21. In combination, means providing a substantially collimated beam of light, a light-polarizing device in sheet-like form adapted to resolve light incident thereon into a plurality of differently polarized, partially merged light beams having relatively slightly differing directions of propagation, said device comprising a multiplicity of birefringent elements and a multiplicity of light-transmitting elements, said light-transmitting elements and birefringent elements having a substantially common index of refraction for light vibrating in a predetermined direction and having different indices of refraction for light vibrating at right angles to said direction, said birefringent elements each having plane surface portions forming an interface with a complementary surface portion of a light-transmitting element, said interfaces being substantially parallel, means for positioning said device adjacent the first-mentioned means, the said interfaces being held in an inclined position with respect to said collimated beam so that said beam is incident upon said interfaces at a predetermined angle, said angle being at least equal to the critical angle of incidence for light vibrating in the direction for which the indices of refraction of said light-transmitting elements and said birefringent elements are not matched, a second light-transmitting sheet comprising birefringent material for causing the component beams transmitted by said polarizing device to assume the same polarization characteristics, means for positioning said last named sheet adjacent to, in parallelism with, and overlying said polarizing device so as to be in the path of the merged portions of said component beams, a third sheet comprising birefringent material, and means for positioning said third sheet between and substantially overlying said first named sheets, said third sheet being of such birefringence and being so positioned relatively to the other said sheets with respect to its optical axes that it causes the vibration direction of at least one of said beams to make predetermined angles with the azimuths of resolution within said second named sheet.

22. A light-polarizing sheet adapted to resolve a beam of light normally incident on a surface thereof into a plurality of differently polarized, substantially collimated light beams having different directions of propagation, comprising a multiplicity of substantially parallel, transverse, doubly refracting layers having isotropic films of less thickness than said layers positioned therebetween and forming interfaces therewith, the index of refraction of said isotropic films being substantially equal to the lower index of refraction of said doubly refracting layers, said layers and films being inclined at such an angle to a normal to the surface of said sheet that light normally incident on said sheet and vibrating in a direction for which the indices of refraction of said films and layers are not equal is substantially completely internally reflected from said interfaces.

23. In combination, a light source, means for substantially collimating the light from said source, and a sheet of transparent, plastic material positioned to intercept said beam so that said beam is incident normally upon a surface thereof, said sheet comprising a multiplicity of transverse, light-transmitting, doubly refractive elements having plane surfaces and inclined at an angle to a normal to a surface of said sheet and a second multiplicity of light-transmitting elements having plane surfaces intercalated with and forming interfaces with said first multiplicity and having an index of refraction equal to the index of refraction of said first multiplicity for light vibrating in a predetermined direction, the indices of refraction of said multiplicities for light vibrating at right angles to said direction being different, a second sheet of light-transmitting material comprising means for causing the two components of light beams traversing said first mentioned sheet to assume the same polarization characteristics, and means for positioning said second sheet in the path of said component beams where they are substantially merged.

24. In combination, a light source, means for substantially collimating the light from said source, and a sheet of transparent, plastic material positioned to intercept said beam so that said beam is incident normally upon a surface thereof, said sheet comprising a multiplicity of transverse, light-transmitting, doubly refractive elements having plane surfaces and inclined at an angle to a normal to a surface of said sheet and a second multiplicity of light-transmitting elements intercalated with said first multiplicity and having an index of refraction equal to the index of refraction of said first multiplicity for light vibrating in a predetermined direction, the indices of refraction of said multiplicities for light vibrating at right angles to said direction being different, a second sheet of light-transmitting material comprising means for causing the two components of light beams traversing said first mentioned sheet to assume the same polarization characteristics, means for positioning said second sheet in the path of said component beams where they are substantially merged, a third sheet of light-transmitting material comprising a fractional wave retardation plate for each component of light traversing said first mentioned sheet, and means for positioning said third named sheet between said first and second sheets.

25. In combination, a light source, means for substantially collimating the light from said source, and a sheet of transparent, plastic material positioned to intercept said beam so that said beam is incident normally upon a surface thereof, said sheet comprising a multiplicity of transverse, light-transmitting, doubly refractive elements having plane surfaces and inclined at an angle to a normal to a surface of said sheet and a second multiplicity of light-transmitting elements intercalated with said first multiplicity and having an index of refraction equal to the index of refraction of said first multiplicity for light vibrating in a predetermined direction, the indices of refraction of said multiplicities for light vibrating at right angles to said direction being different, the elements of one of said multiplicities being thicker than the elements of the other of said multiplicities, there being lenticular means on the edges of said thicker elements upon which said collimated beam is incident for directing light rays incident thereon in such a manner that each of said rays impinges upon only one of the elements of the other of said multiplicities.

26. A headlight for motor vehicles and the like comprising, in combination, a light source, a reflector adapted with said source to project a substantially collimated light beam, polarizing means mounted in said headlight and positioned to intercept substantially all of said beam, said means comprising a sheet of plastic material adapted to resolve said beam into a plurality of partially merged beams having different polarization characteristics and relatively slightly differing directions of propagation, both of said beams traversing said sheet, a second light-transmitting sheet of substantially the same area as said polarizing sheet and comprising means for causing the component beams transmitted by said polarizing sheet to assume the same polarization characteristics, and means for positioning said last named sheet adjacent and substantially overlying the surface of said polarizing sheet more distant from said light source.

27. A headlight for motor vehicles and the like comprising, in combination, a light source, a reflector adapted with said source to project a substantially collimated light beam, a polarizing device in sheet form mounted in said headlight and positioned to intercept substantially all of said beam propagated in a direction normal to a surface thereof, said device comprising a multiplicity of birefringent elements and means comprising light-transmitting material for assembling said elements in spaced relation in said device, said light-transmitting material and birefringent elements having a substantially common index of refraction for light vibrating in a predetermined direction and having different indices of refraction for light vibrating at right angles to said direction, said birefringent elements each having plane surfaces forming at least one interface with said light-transmitting material, said interfaces being substantially parallel and being inclined at a predetermined angle to the surface of said sheet adjacent said light source, said angle being at least equal to the critical angle of incidence on said interfaces for light vibrating in the direction for which the indices of refraction of said light-transmitting material and said birefringent elements are not matched, a second light-transmitting sheet of substantially the same area as said polarizing sheet and comprising means for causing the component beams transmitted by said polarizing sheet to assume the same polarization characteristics, and means for positioning said last named sheet adjacent and substantially overlying the surface of said polarizing sheet more distant from said light source.

28. A headlight for motor vehicles and the like comprising, in combination, a light source, a reflector adapted with said source to project a substantially collimated light beam, a polarizing device in sheet form mounted in said headlight and positioned to intercept substantially all of said beam normally to a surface thereof, said device comprising a multiplicity of transverse, doubly refracting elements and a second multiplicity of transverse, light-transmitting elements intercalated with said first multiplicity, said light-transmitting elements and birefringent elements having a substantially common index of refraction for light vibrating in a predetermined direction and having different indices of refraction for light vibrating at right angles to said direction, said birefringent elements having each plane surface portions forming an interface with a complementary surface portion of a light-transmitting element, said interfaces being inclined at a predetermined angle to the surface of said sheet adjacent said light source, said angle being at least equal to the critical angle of incidence on the interfaces formed by adjacent ones of said elements for light vibrating in the direction for which the indices of refraction of said elements are not matched, a second light-transmitting sheet of substantially the same area as said polarizing sheet and comprising means for causing the component beams transmitted by said polarizing sheet to assume the same polarization characteristics, and means for positioning said last named sheet adjacent and substantially overlying the surface of said polarizing sheet more distant from said light source.

29. A headlight for motor vehicles and the like comprising, in combination, a light source, a reflector adapted with said source to project a substantially collimated light beam, a laminated, light-transmitting device mounted in said headlight and positioned to intercept substantially all of said beam normally to a surface thereof, a layer of said device adjacent said light source comprising a polarizing device in sheet form comprising a multiplicity of transverse, doubly refracting elements and a second multiplicity of transverse, light-transmitting elements intercalated with said first multiplicity, said light-transmitting elements and birefringent elements having a substantially common index of refrac-
tion for light vibrating in a predetermined direction and having different indices of refraction for light vibrating at right angles to said direction, said birefringent elements having each plane surface portions forming an interface with a complementary surface portion of a light-transmitting element, said interfaces being inclined at a predetermined angle to the surface of said sheet adjacent said light source, said angle being at least equal to the critical angle of incidence on the interfaces formed by adjacent ones of said elements for light vibrating in the direction for which the indices of refraction of said elements are not matched, a second layer of said laminated device comprising means for causing the component beams transmitted by said polarizing sheet to assume the same polarization characteristics, said layer comprising birefringent material, and a third layer comprising birefringent material positioned between said first and second named layers, said third layer being of such birefringence and being so positioned relatively to the other said layers with respect to its optical axes that it causes the vibration direction of at least one of said beams to make predetermined angles with the azimuths of resolution within said second named layer.

EDWIN H. LAND.
CLINTON J. T. YOUNG.

CERTIFICATE OF CORRECTION.

Patent No. 2,270,535.                                       January 20, 1942.

EDWIN H. LAND, ET AL.

It is hereby certified that error appears in the printed specification of the above numbered patent requiring correction as follows: Page 6, second column, line 28, for "sheet" read --sheets--; page 7, second column, line 13, before the period insert --or plane polarized--; and that the said Letters Patent should be read with this correction therein that the same may conform to the record of the case in the Patent Office.

Signed and sealed this 11th day of January, A. D. 1944.

(Seal)                              Henry Van Arsdale,
                                    Acting Commissioner of Patents.

CERTIFICATE OF CORRECTION.

Patent No. 2,270,535.　　　　　　　　　　　　　　January 20, 1942.

EDWIN H. LAND, ET AL.

It is hereby certified that error appears in the printed specification of the above numbered patent requiring correction as follows: Page 6, second column, line 28, for "sheet" read --sheets--; page 7, second column, line 13, before the period insert --or plane polarized--; and that the said Letters Patent should be read with this correction therein that the same may conform to the record of the case in the Patent Office.

Signed and sealed this 11th day of January, A. D. 1944.

Henry Van Arsdale,
(Seal)　　　　　　　　　　　　　　Acting Commissioner of Patents.